United States Patent

[11] 3,583,808

[72] Inventors Marvin I. Glass
Chicago;
Gunars Licitis, Lombard, both of, Ill.

[21] Appl. No 827,507
[22] Filed May 26, 1969
[45] Patented June 8, 1971
[73] Assignee Marvin Glass & Associates
Chicago, Ill.
Continuation-in-part of application Ser. No. 555,200, June 3, 1966, now Patent No. 3,484,160.

[54] OPTICAL MEANS FOR AUDIO-VISUAL DEVICE
4 Claims, 5 Drawing Figs.

[52] U.S. Cl. ........ 353/7, 40/28.1, 350/134, 353/15, 353/19
[51] Int. Cl. ........ G03b 21/00, G03b 31/00, G03b 31/06
[50] Field of Search ........ 353/1, 7, 15, 16, 17, 18, 19; 35/75; 40/28.1; 350/133, 134, 135

[56] References Cited

UNITED STATES PATENTS

| | | | |
|---|---|---|---|
| 2,487,459 | 11/1949 | Mast | 350/134(UX) |
| 2,511,334 | 6/1950 | Gruber | 350/134 |
| 3,436,083 | 4/1969 | Elwell | 274/9 |
| 3,432,230 | 3/1969 | Glass et al. | 353/16 |
| 3,484,160 | 12/1969 | Glass et al. | 353/16 |

*Primary Examiner*—Robert B. Hull
*Assistant Examiner*—Steven L. Stephan
*Attorney*—James F. Coffee

ABSTRACT: An optical system for use in an audio-visual device to be used for viewing stereoscopic photographic transparencies. External light is gathered into the housing for the device by a Fresnel lens and passed through a translucent record to the pair of transparencies being viewed. Axially aligned with the transparencies being viewed are a pair of eyepieces containing double convex magnifying lenses.

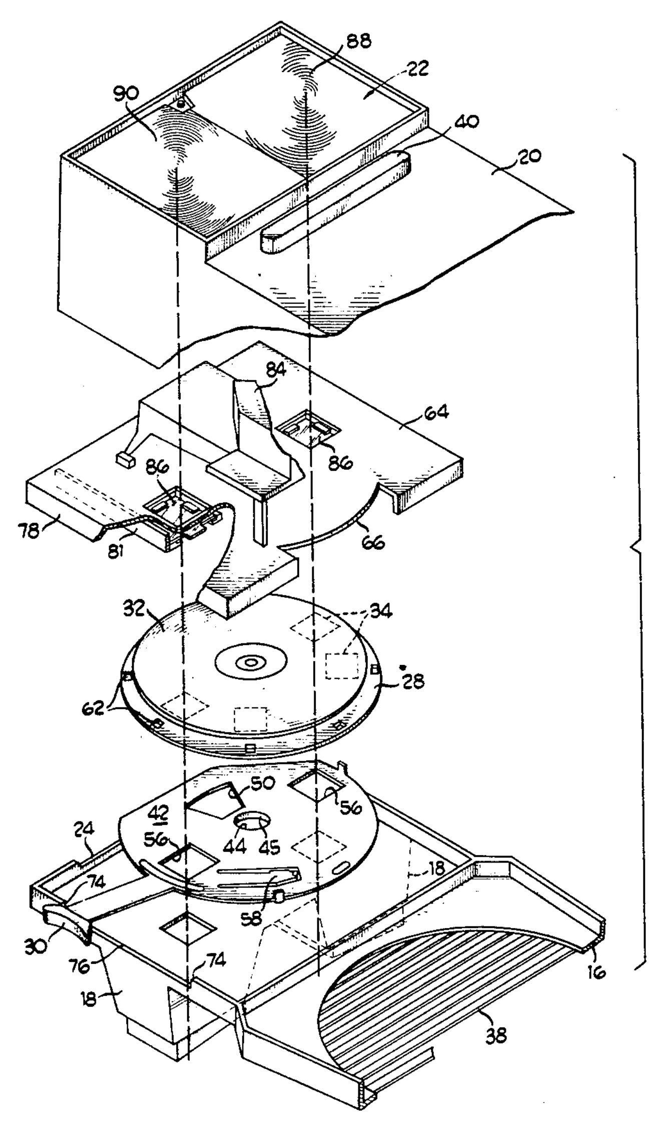

OPTICAL MEANS FOR AUDIO-VISUAL DEVICE

The present invention is a continuation-in-part of copending U.S. application Ser. No. 555,200, filed June 3, 1966, now U.S. Pat. No. 3,484,160.

The present invention relates generally to an audio-visual device and is particularly directed to an improved arrangement of optical means for use in an audio-visual device for viewing stereoscopic transparencies. In the device disclosed and claimed in the aforementioned copending patent application, there is utilized a combination record and transparency reel wherein a translucent record is rotatably mounted on a circular reel containing stereoscopic transparencies, with the record overlying the transparencies on the reel. It is the primary object of the present invention to provide an optical system for the above-described device, which affords easy viewing of the transparencies through use of light that is external of the audio-visual unit. Other objects and advantages will become apparent from the following description of the selected embodiment of the invention, as illustrated in the accompanying drawings, wherein:

FIG. 1 is a perspective view of the audio-visual unit as seen generally from the rear or viewing side;

FIG. 2 is a front elevational view of the audio-visual unit;

FIG. 3 is an enlarged sectional view taken generally along the line 3–3 of FIG. 2;

FIG. 4 is an enlarged elevational view of a plate portion of the unit, and;

FIG. 5 is a fragmentary, exploded view of the audio-visual unit, with portions omitted or broken away for purposes of clarity.

With reference to FIGS. 1 and 2, it will be seen that the selected embodiment of this invention comprises generally an audio-visual device 14 provided with an outer case having a rearward wall 16 supporting a pair of tapering tubes 18, which project rearwardly therefrom and are spaced to correspond with the spacing of the average human eyes. A forward wall 20 (FIG. 2) includes a light gathering lens 22 at the upper portion, and a slotted opening 24 in the top wall 26 of the case is adapted to receive a circular card or disc 28 (FIG. 5) having stereoscopic pictures adjacent its periphery, so that a person looking through the viewing lens tubes 18 can view such pictures. The circular card 28 can be selectively rotated about its axis, by means of a lever 30 at the side of the case, to thereby change the pictures being viewed.

The stereoscopic transparency holder 28 is combined with a relatively rotatable sound recording element or record 32 bearing a plurality of messages, with each message being specifically related to the subject matter of one of the pairs of transparencies in the holder. The record 32 is of translucent material and, consequently, the record can overlie the transparencies 34 without seriously increasing the requirement for light through the light focusing lens 22 in order to view the pictures. The viewer case contains sound reproducing mechanism, and each of the forward and rearward walls preferably includes a grill, 36 and 38 respectively, for passage therethrough of the sound produced within the case. An operating lever or button 40 (FIG. 2) on the forward wall of the case is effective to actuate the sound reproducing mechanism (not shown). A detailed description of the sound reproducing mechanism is given in the copending application Ser. No. 555,200.

Generally, the means for supporting transparency holder or disc 28 and for moving the disc from one set or pair of transparencies to another for viewing through the eyepieces 18 is a partially circular plate 42, seen particularly in FIGS. 3 and 5. Plate 42 includes a central opening 44 formed with an axially projecting flange portion 45 (FIG. 5), which engages and locates the plate 42 in a raised circular portion 48 (FIG. 3) formed on the inside of the backwall 16. The plate 42 includes the projecting lever 30, which provides means for rotating the cover plate to thereby rotate disc 28 and change the location of the photographic transparencies 34 relative to the viewing tubes 18. Plate 42 also includes a radial slot 50 which is normally aligned with an aperture 52 (FIG. 1) in the rear wall 16 of the housing so as to provide means for viewing the title or description ordinarily printed on the transparency disc holder. The disc or reel 28 is inserted through the slotted opening 24 in the top wall of the housing with the reel in forwardly, overlying relation to the rotatable plate 42 (FIGS. 3 and 5).

The rotatable plate 42 also includes a pair of laterally aligned window portions or openings 56 in position for registration with the axes of the pair of tubular viewing lens members 18. An upwardly bent, springlike section 58 of plate 42 provides a one-way drive means which cooperates with openings 62 (FIG. 5) in the transparency holder 28 to effect easy rotation of the holder 28 with the cover plate 42 when the lever 30 is depressed. As seen particularly in FIGS. 3—5, there is an overlying plate or casing 64 which cooperates with the plate 42 in providing means for receiving the transparency holder 28, and this overlying plate 64 has an arcuate rib 66 adjacent its lower edge in position to assist in centering the circular transparency holder 28 on the cover plate 42. The movement of the lever 30 is limited by a pair of shoulders 74 (FIG. 5) on the end of the lever slot 76 formed in the housing wall, with the uppermost shoulder insuring proper indexing of the windows 56 with the transparencies and the viewing lens portions 18. The clearance between the rotatable plate 42 and the overlying plate 64 is, of course, sufficient to permit free passage and rotation of the transparency disc holder 28 and record 32. The springlike ear 58 serves as a one-way clutch or drive in providing rotation of the disc 28 as the lever 30 is lowered and in permitting movement of the plate 42 relative to the disc 28 upon the return, upward movement of the lever.

The overlying plate 64 is seen particularly in FIG. 4 and comprises a generally rectangular plate with edges 78, which fit snugly within the inwardly facing wall portions 80 of the housing (FIG. 3), and a pair of ribs 81 which assist arcuate rib 66 in locating the reel 28 within the unit. Plate 64 is also formed with a pair of window portions 82, which are aligned with the windows 56 in cover plate 42 and with the tubular viewing lens members 18. The plate 64 also serves as a support for a portion of the sound producing mechanism indicated generally at 84.

It will be noted from the foregoing that the record 30 is translucent and that the outer edge of the record overlies the transparencies 34 on reel 28. The translucent record is preferably transparent vinyl or the like and permits passage of light therethrough to the transparencies. However, in order to achieve maximum clarity and light in the viewing of the transparencies there is provided a novel optical system or combination of lenses for use in the audio-visual unit.

More particularly, the window sections 82 in plate 64 (FIG. 4) are each equipped with a light diffuser 86, which is preferably clear plastic etched on one side, but may be etched glass, matte glass or the like, so as to provide for a generally uniform diffusion of light passing through the transparencies. It will be noted particularly in FIGS. 3 and 5 that the diffusers 86 are disposed so as to be positioned between the translucent record 32 and the transparencies 34 on reel 28 which are being viewed through eyepieces 18. This arrangement has the additional advantage that the diffusers 86 serve to mask or essentially eliminate the recording grooves formed on the record 32 from the view of the user of the audio-visual device.

As indicated previously, the front of the audio-visual unit is equipped with a light gathering lens means 22 which extends substantially across the upper portion of the front wall of the unit. Lens 22 is a condenser lens and is preferably in the form of a pair of rectangularly shaped Fresnel lenses 88 and 90, each of which provide a series of concentric circular lens elements for maximum effect in gathering and transmitting light into the housing. The focal length of lenses 88 and 90 is preferably slightly longer than the distance between the lenses and the position of the transparencies 34 disposed between windows 56 and diffusers 86 in the housing, in order to insure proper lighting of the transparencies. By providing a focal length slightly longer than the normal spacing of the lenses and transparencies, provision is made for the occasional condition when the transparency holder may be warped to place the transparencies farther from the lenses. Eyepieces 18 are provided with double convex viewing lenses 92 which afford a magnifying effect to the transparencies being viewed. The axes of viewing lenses 92 coincide with the axes of the Fresnel lenses 88 and 90, respectively, as well as being centered with respect to windows 56 and plate openings 82 (see FIG. 5). Thus, it is seen that the external light, either ordinary sunlight or light from an artificial source such as a lamp, passes through the light gathering lens 22 and through the translucent record 32 to the diffuser 86, and then through the selected pair of transparencies 34 which are aligned with the viewing lenses 88. As a result, the viewer receives a magnified stereoscopic image which is well lighted, and the presence of the record 32 provides little interference with the lighting nor does the rotation of the record 32 provide any distraction to the viewer.

Although shown and described with respect to a particular structural arrangement, it will be apparent that various modifications might be made without departing from the principles of this invention.

What we claim is:

1. In an audio-visual device for stereoscopic viewing of pairs of photographic transparencies and for reproducing accompanying sounds, said device including a housing adapted to receive a removable transparency-carrying disc having a plurality of circumferentially arranged pairs of transparencies mounted therein and having a translucent sound record rotatably mounted on said disc in overlying relation to the transparencies, and means in said housing operable to reproduce the sound recorded on said record, the improvement comprising optical means in said housing affording the viewing of a selected pair of said pairs of transparencies, said optical means comprising light gathering lens means on the forward wall of the housing, a pair of viewing lenses disposed in spaced-apart relation adjacent the rear wall of the housing in position to be looked through by the eyes of a viewer, and light diffusing means disposed within said housing intermediate said viewing lenses and said light gathering lens and in a position such that when said disc is inserted in said housing the record portion is forward of said diffusing means and the photographic transparencies are rearward thereof.

2. Optical means for an audio-visual device as set forth in claim 1, wherein said light gathering lens means comprises a pair of circular Fresnel lenses disposed side-by-side and coaxial with said viewing lenses.

3. Optical means for an audio-visual device as set forth in claim 2, wherein said viewing lenses are double convex lenses.

4. Optical means for an audio-visual device as set forth in claim 1, wherein said light diffusing means is disposed between said translucent record and the pair of transparencies positioned on the axes of said light gathering lens means and said viewing lens, and the focal length of said light gathering lens is substantially equal to the distance from said lens to said transparencies.